US009523004B2

(12) United States Patent
Hervieu et al.

(10) Patent No.: US 9,523,004 B2
(45) Date of Patent: Dec. 20, 2016

(54) SURFACE TREATMENT COMPOSITION, PROCESS FOR PRODUCING THE SAME, AND SURFACE-TREATED ARTICLE

(75) Inventors: Gregory Hervieu, Charenton-le-Pont (FR); Pierre-Jean Calba, Charenton-le-Pont (FR); Don Lee Kleyer, Hemlock, MI (US); Masayuki Hayashi, Ichihara (JP); Peter Cheshire Hupfield, Dyfed (GB); Tomohiro Yoshida, Settsu (JP); Yasuo Itami, Settsu (JP); Masahiko Maeda, Osaka (JP); Tetsuya Masutani, Osaka (JP)

(73) Assignees: ESSILOR INTERNATIONAL, Charenton-le-Pont (FR); DOW CORNING CORPORATION, Midland, MI (US); DAIKIN INDUSTRIES, LTD., Osaka-Shi, Osaka (JP)

( * ) Notice: Subject to any disclaimer, the term of this patent is extended or adjusted under 35 U.S.C. 154(b) by 151 days.

(21) Appl. No.: 13/508,870

(22) PCT Filed: Nov. 10, 2010

(86) PCT No.: PCT/US2010/056194
§ 371 (c)(1),
(2), (4) Date: Sep. 20, 2012

(87) PCT Pub. No.: WO2011/060047
PCT Pub. Date: May 19, 2011

(65) Prior Publication Data
US 2013/0004780 A1    Jan. 3, 2013

(51) Int. Cl.
*C09D 7/00* (2006.01)
*B32B 9/04* (2006.01)
*C09D 5/00* (2006.01)
*C09D 5/16* (2006.01)

(52) U.S. Cl.
CPC ............. *C09D 5/006* (2013.01); *C09D 5/1675* (2013.01); *Y10T 428/31663* (2015.04)

(58) Field of Classification Search
None
See application file for complete search history.

(56) References Cited

U.S. PATENT DOCUMENTS

| | | | | | |
|---|---|---|---|---|---|
| 4,558,148 | A | * | 12/1985 | Ishikawa | C07C 29/40 548/460 |
| 4,908,479 | A | * | 3/1990 | Saeki | C07C 251/20 564/277 |
| 5,869,728 | A | * | 2/1999 | Jenker et al. | 556/479 |
| 7,294,731 | B1 | | 11/2007 | Flynn et al. | |
| 2003/0161962 | A1 | * | 8/2003 | Lines et al. | 427/387 |
| 2008/0293892 | A1 | * | 11/2008 | Chung et al. | 525/356 |
| 2009/0208728 | A1 | | 8/2009 | Itami et al. | |
| 2012/0135252 | A1 | | 5/2012 | Kishikawa et al. | |

FOREIGN PATENT DOCUMENTS

| | | | |
|---|---|---|---|
| EP | 2078977 | A1 | 7/2009 |
| JP | 6-029332 | B2 | 4/1994 |
| JP | 2000-094567 | A | 4/2000 |
| JP | 03022906 | * | 3/2003 |
| JP | 2005-350404 | A | 12/2005 |
| JP | 2006-291266 | A | 10/2006 |
| JP | 2007-196162 | A | 8/2007 |
| JP | 2008-015167 | A | 1/2008 |
| JP | 2008-534696 | A | 8/2008 |
| JP | 2009-285915 | A | 12/2009 |
| KR | 10 20120038991 | A | 4/2012 |
| WO | WO03022906 | A1 * | 3/2003 |
| WO | WO 2006/107083 | A2 | 10/2006 |

OTHER PUBLICATIONS

English machine translation of WO2003022906 as JP03022906 AIPN JPO (2003).*
English language abstract for JP 6-029332 extracted from the espacenet.com database on Jul. 2, 2012, 7 pages.
International Search Report for Application No. PCT/US2010/056194 dated Apr. 5, 2011, 3 pages.
English language abstract and machine-assisted English translation for JP 2000-094567 extracted from the PAJ database on Dec. 2, 2013, 24 pages.
English language abstract and machine-assisted English translation for JP 2008-534696 extracted from the PAJ database on Dec. 2, 2013, 47 pages.
English language abstract and machine-assisted English translation for JP 2000-094567 extracted from the PAJ database on Oct. 29, 2014, 18 pages.
English language abstract and machine-assisted English translation for JP 2005-350404 extracted from the PAJ database on Oct. 29, 2014, 30 pages.
English language abstract and machine-assisted English translation for JP 2006-291266 extracted from the PAJ database on Oct. 29, 2014, 25 pages.
English language abstract and machine-assisted English translation for JP 2007-196162 extracted from the PAJ database on Oct. 29, 2014, 35 pages.
English language abstract and machine-assisted English translation for JP 2008-015167 extracted from the PAJ database on Oct. 29, 2014, 26 pages.
English language abstract and machine-assisted English translation for JP 2009-285915 extracted from the PAJ database on Oct. 29, 2014, 30 pages.
English language abstract not found for KR 20 2012 0038991; however, see English language equivalent U.S. Pat. No. 2012/0135252. Original document extracted from espacenet.com database on Oct. 29, 2014, 30 pages.

* cited by examiner

*Primary Examiner* — Kenneth Stachel
(74) *Attorney, Agent, or Firm* — Howard & Howard Attorneys PLLC

(57) ABSTRACT

A surface treatment composition comprising (i) an organosilicon compound having an alkoxysilane functional group at the end of a fluorocontaining polyether chain and (ii) fluorocontaining polyether compound s, wherein a content of the fluorocontaining polyether compounds in the surface treatment composition is less than 25 mol % based on the surface treatment composition.

10 Claims, No Drawings

SURFACE TREATMENT COMPOSITION, PROCESS FOR PRODUCING THE SAME, AND SURFACE-TREATED ARTICLE

RELATED APPLICATIONS

This application claims priority to and all the advantages of International Patent Application No. PCT/US2010/056194, filed on Nov. 10, 2010, which claims priority to International Patent Application No. PCT/US2009/064016, filed on Nov. 11, 2009.

TECHNICAL FIELD

The present invention is related to i) a surface treatment composition comprising an organosilicon compound for use in forming a low surface energy layer or an antifouling layer on the surface of various materials, ii) a process for producing the same and iii) a surface-treated article to which the same is applied.

BACKGROUND ART

Antireflection coatings, optical filters, optical lenses, spectacle lenses, beam splitters, prisms, mirrors and other optical elements and sanitary wares are liable to be stained with fingerprints, skin oil, sweat, cosmetics, etc., when used. Once adhering, such stains are not easily removed, and in particular, stains adhering to optical members with antireflection coatings are easily noticeable and pose problems.

To solve such problems relating to antifouling, techniques using various surface treatment compositions have hitherto been proposed.

For example, Japanese Examined Patent Publication No. 1994-29332 has proposed an antifouling, low-reflection plastic that has, on its surface, an antireflection coating comprising polyfluoroalkyl group-containing, mono- and disilane compounds and halogen-, alkyl- or alkoxysilane compound.

Recently, WO2006/107083 has proposed a surface treatment composition comprising organosilicon compounds bearing an alkoxysilyl functional group at the end of a fluoropolymer chain. This surface treatment composition provides a low-surface-energy layer that prevents moisture or dirt from adhering to the surface of various materials, especially antireflective films and like optical members and glasses.

However, the antifouling coatings formed by the hitherto known processes are not necessarily sufficient in anti-fouling properties, and in particular, their stain resistance fairly reduces as they are used for a longer period. Therefore, development of an antifouling coating with excellent antifouling properties and excellent durability is desired.

DISCLOSURE OF INVENTION

The present invention is to solve the problems of the prior art techniques described above and to provide a surface treatment composition that forms a superior, low-surface-energy treated layer of high durability that prevents moisture or dirt such as finger prints, skin oil, sweat, and cosmetics from adhering to the surface of various materials, especially antireflective films, optical members and glasses, and that allows dirt and moisture, once adhered, to be easily wiped off.

Another object of the present invention is to provide a process for producing the surface treatment composition that can form a superior low surface energy layer having a high durability.

A further object of the present invention is to provide a method for easily forming a superior low surface energy layer having a high durability.

Yet another object of the present invention is to provide optical members (e.g., antireflective films, optical filters, optical lenses, eyeglass lenses, beam splitters, prisms and mirrors) and various materials furnished with the superior low surface energy layer having a high durability.

The present invention provides a surface treatment composition comprising an organosilicon compound represented by the general formula (A):

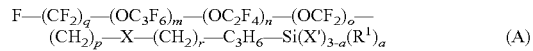

$$F-(CF_2)_q-(OC_3F_6)_m-(OC_2F_4)_n-(OCF_2)_o-(CH_2)_p-X-(CH_2)_r-C_3H_6-Si(X')_{3-a}(R^1)_a \quad (A)$$

wherein q is an integer from 1 to 3; m, n, and o are independently integers from 0 to 200; p is 1 or 2; X is oxygen or a bivalent organic group; r is an integer from 0 to 17; $R^1$ is a $C_1$-$C_{22}$ linear or branched hydrocarbon group that does not have an unsaturated aliphatic bond; a is an integer from 0 to 2; and X' is an independently selected hydrolysable group, wherein a content of fluorine-containing compounds represented by the general formulas (B) and (C):

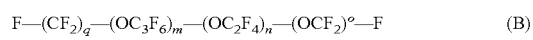

$$F-(CF_2)_q-(OC_3F_6)_m-(OC_2F_4)_n-(OCF_2)_o-F \quad (B)$$

wherein q, m, n and o are the same as described above,

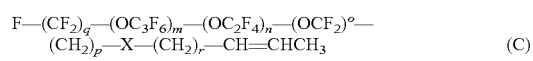

$$F-(CF_2)_q-(OC_3F_6)_m-(OC_2F_4)_n-(OCF_2)_o-(CH_2)_p-X-(CH_2)_r-CH=CHCH_3 \quad (C)$$

wherein q, m, n, o, p, r and X are the same as described above, in the surface treatment composition is less than 25 mol % based on the surface treatment composition.

The present invention especially provides the surface treatment composition comprising the organosilicon compound wherein, in the general formula (A), the hydrolysable group X' is at least one selected from an alkoxy (—OR) group and an alkylamino (—NHR or —NR$_2$) group wherein R is independently a $C_1$-$C_{22}$ linear or branched alkyl group and two R groups may form a cyclic amine, and the integer a is 0.

The present invention especially provides the surface treatment composition comprising the organosilicon compound represented by any one of the general formulas (A-1), (A-2) and (A-3):

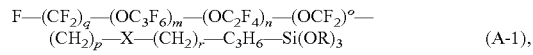

$$F-(CF_2)_q-(OC_3F_6)_m-(OC_2F_4)_n-(OCF_2)_o-(CH_2)_p-X-(CH_2)_r-C_3H_6-Si(OR)_3 \quad (A-1),$$

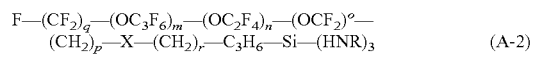

$$F-(CF_2)_q-(OC_3F_6)_m-(OC_2F_4)_n-(OCF_2)_o-(CH_2)_p-X-(CH_2)_r-C_3H_6-Si-(HNR)_3 \quad (A-2)$$

and

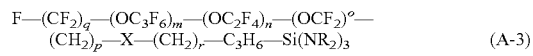

$$F-(CF_2)_q-(OC_3F_6)_m-(OC_2F_4)_n-(OCF_2)_o-(CH_2)_p-X-(CH_2)_r-C_3H_6-Si(NR_2)_3 \quad (A-3)$$

wherein q, m, n, o, p, X and r are the same as described above, and R is independently a $C_1$-$C_{22}$ linear or branched alkyl group, and two R groups may form a cyclic amine, wherein a content of fluorine-containing compounds represented by the general formulas (B) and (C) in the surface treatment composition is less than 25 mol % based on the surface treatment composition.

The present invention more preferably provides the surface treatment composition comprising the organosilicon compound wherein, in the general formula (A), the hydrolysable group X' is the alkylamino (—NHR or —NR$_2$) group wherein R is the same as described above, and the integer a is 0, wherein a content of fluorine-containing compounds represented by the general formulas (B) and (C) in the surface treatment composition is less than 25 mol % based on the surface treatment composition.

The present invention more specifically provides the surface treatment composition, wherein the organosilicon compound represented by the general formula (A) is represented by a general formula (i-d-i) or (i-d-ii):

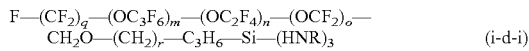
(i-d-i)

or

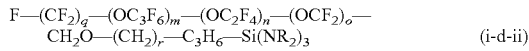
(i-d-ii)

wherein q, m, n, o, r and R are the same as described above, and fluorine-containing compounds represented by the general formulas (B) and (C) are represented respectively by general formulas (ii) and (i-c-d):

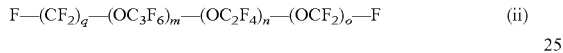
(ii)

and

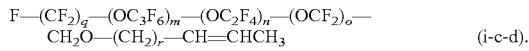
(i-c-d).

The present invention provides a process for producing a surface treatment composition comprising an organosilicon compound, which comprises the steps of:
(a) contacting a mixture comprising (D) acid fluorides of perfluoropolyether and (E) non-reactive perfluoropolyether with a reducing agent to react the acid fluorides thereby producing a reaction mixture comprising (F) hydroxyl perfluoropolyether thus generated and non-reactive perfluoropolyether (E);
(b) purifying the reaction mixture prepared in the step (a) by column chromatography to produce a purified material in which a content of the hydroxyl perfluoropolyether (F) in the purified material is higher than a content of the hydroxyl perfluoropolyether (F) in the reaction mixture;
(c) contacting the purified material obtained in the step (b) with allyl halide to react the hydroxyl perfluoropolyether (F) thereby producing a reaction mixture comprising (G) allyl perfluoropolyether thus generated and non-reactive perfluoropolyether (E); and
(d) contacting the reaction mixture obtained in the step (c) with hydrosilane in the presence of an isomer reducing agent and a transition metal catalyst to react the allyl perfluoropolyether thereby producing a surface treatment composition comprising:
(l) organosilicon compounds each having an alkoxysilane functional group at the one end of a fluorine-containing polyether chain, non-reactive perfluoropolyether (F), and (H) isomer of allyl perfluoropolyether (G), wherein a content of non-reactive perfluoropolyether (E) and isomer (H) in the surface treatment composition is less than 25 mol % based on the surface treatment composition.

The present invention also provides a process for producing a surface treatment composition comprising an organosilicon compound, which comprises the steps of:
(a) contacting a raw material mixture which comprises compounds represented by the following general formulas (i) and (ii):

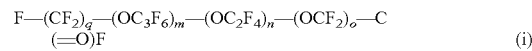
(i)

wherein q is an integer from 1 to 3; m, n and o are independently integers from 0 to 200;

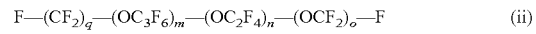
(ii)

wherein q, m, n and o are the same as described above, with a reducing agent to react the compound (i) thereby producing a reaction mixture which comprises thus prepared alcohols represented by the following general formula (i-b):

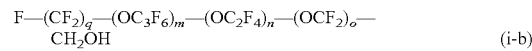
(i-b)

wherein q, m, n, and o are the same as described above; and the compound represented by the general formula (ii);
(b) purifying the reaction mixture obtained in the step by column chromatography to remove at least part of the fluorine-containing compound represented by the general formula (ii), and thereby producing a purified material in which a content of the compound represented by the general formula (i-b) in the purified material is higher than a content in the reaction mixture;
(c) contacting the purified material produced in the step (b) with

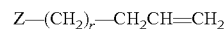

wherein Z is a halogen atom; r is an integer from 0 to 17, to react the compound (i-b) thereby producing a reaction mixture which comprises thus prepared allyl compounds represented by the following general formula (i-c):

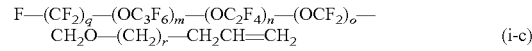
(i-c)

wherein q, m, n, o and r are the same as described above; and the compound represented by the general formula (ii), wherein a content of the compound represented by the general formula (ii) in this intermediate composition is preferably less than 5 mol % based on the intermediate composition; and
(d) contacting the reaction mixture obtained in the step (c) with hydrosilane compound represented by the general formula (iii):

H—Si(X')$_{3-a}$(R$^1$)$_a$ (iii)

wherein R$^1$, a, and X' are the same as described above, and an isomer reducing agent in the presence of a transition metal catalyst and then, if necessary, contacting with alkali metal alkoxide to react the compound (i-c) thereby producing the surface treatment composition comprising:
an organosilicon compound represented by the general formula (i-d):

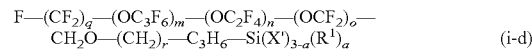
(i-d)

wherein q, m, n, o, a, r, X' and R$^1$ are the same as described above;
fluorine-containing compounds represented by the general formulas (ii) and (i-c-d):

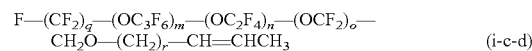
(i-c-d)

wherein q, m, n, o and r are the same as described above, wherein a content of fluorine-containing compounds represented by the general formulas (ii) and (i-c-d) in the surface treatment composition is less than 25 mol % based on the surface treatment composition.

The present invention especially provides the process for producing the surface treatment composition, wherein the organosilicon compound is represented by the general formula (i-d):

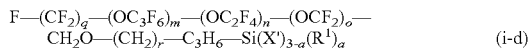  (i-d)

wherein r is 0, X' is chlorine or alkoxy, and a is 0, and q, m, n and o are the same as described above, and
the hydrosilylation reaction is conducted between trichlorosilane (HSiCl3) or trialkoxysilane (HSi(OR)3) and a compound represented by the general formula (i-c):

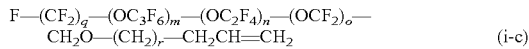  (i-c)

wherein q, m, n, o and r are the same as described above.

The present invention also especially provides the process for producing the surface treatment composition, wherein the step (d) comprises contacting the reaction mixture obtained in the step (c) with trichlorosilane (HSiCl$_3$) and an isomer reducing agent in the presence of a transition metal catalyst and then contacting with alkylamine thereby producing the surface treatment composition comprising:
an organosilicon compound represented by the general formula (i-d-i) or (i-d-ii):

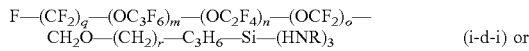  (i-d-i) or

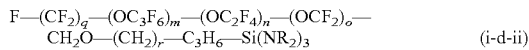  (i-d-ii)

wherein q, m, n, o, r and R are the same as described above, and fluorine-containing compounds represented by the general formulas (ii) and (i-c-d).

The present invention especially provides the process for producing the surface treatment composition, wherein the purifying operation is conducted by column filled with silica gel and a hydrofluorocarbon as a solvent.

The present invention provides a surface of low surface energy having a high durability by using the surface treatment composition.

The present invention provides an optical member, especially an antireflective optical member, and a display device, which are furnished with a treated layer containing the surface treatment composition.

The present invention provides an automobile and aeronautical glasses and sanitary wares having an inorganic material having the aforementioned surface.

MODE FOR CARRYING OUT THE INVENTION

The present inventors intensively studied components of the conventional surface treatment composition comprising organosilicon compounds and reactivity of each of the components when the surface treatment composition is applied to a base material such as a lens. As a result, it was found that the conventional surface treatment composition comprising organosilicon compounds contains, in addition to the organosilicon compounds described by (A), fluorine-containing compounds represented by the general formulas (B) and (C):

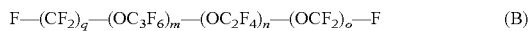  (B)

wherein q, m, n and o are the same as described above,

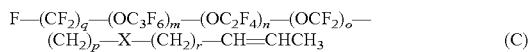  (C)

wherein q, m, n, o, p, r and X are the same as described above, at a large amount, generally about 35 to 60 mol % based on the surface treatment composition, and the fluorine-containing compounds are contained relatively freely in a layer of the surface treatment composition which layer is formed on the base material by the reaction of the organosilicon compound, and therefore, the fluorine-containing compounds decrease the durability of the antifouling properties.

On the contrary, according to the surface treatment composition of the present invention, a content of the fluorine-containing compounds (B) and (C) in the composition is reduced to less than 25 mol % based on the surface treatment composition, therefore, use of this surface treatment composition provides a high quality of antifouling properties and a high durability of the antifouling properties. The present invention has been accomplished based on the unique knowledge by the present inventors as described above.

Among the fluorine-containing compounds, the component (ii) is already present in the starting raw material mixture comprising the component represented by the general formula (i):

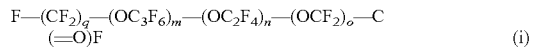  (i)

wherein q, m, n, and o are the same as described above. The other component (C) and/or (i-c-d):

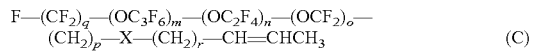  (C)

wherein q, m, n, o, p, r, and X are the same as described above;

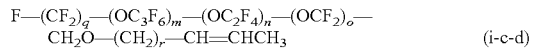  (i-c-d)

wherein q, m, n, o and r are the same as described above, is an isomer by-product produced during the hydrosilylation from the terminal allyl compound represented by the general formula (i-c):

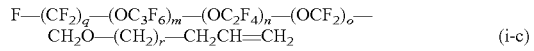  (i-c)

wherein q, m, n, o and r are the same as described above.

A content of the fluorine-containing compounds (B) and/or (ii) and (C) and/or (i-c-d) in the surface treatment composition of the present invention is less than 25 mol % (on the basis of the total amount, which is also applied hereafter), preferably about 20 mol % or less, more preferably about 10 mol % or less, and especially less than 5 mol %. Among the fluorine-containing compounds, the content of (C) and/or (i-c-d) is usually at least 0.1 mol %, for example, 1 mol %.

The surface treatment composition for antifouling layers of the present invention comprises an organosilicon compound represented by the general formula (A):

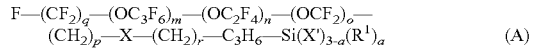  (A)

In the general Formula (A), q is an integer from 1 to 3; m, n, and o are independently integers from 0 to 200; p is 1 or 2; X is oxygen or a bivalent organic group; r is an integer from 0-17; $R^1$ is a $C_1$-$C_{22}$ linear or branched hydrocarbon group that does not have an unsaturated aliphatic bond; a is an integer from 0 to 2; and X' is an independently selected hydrolysable group.

Preferably, in the general formula (A),
m, n, and o are independently integers from 1 to 150,
X is an oxygen atom or a bivalent organic group such as $C_1$-$C_{22}$ linear or branched alkylene group;
$R^1$ is a $C_1$-$C_{22}$ linear or branched alkyl group, more preferably a $C_1$-$C_{12}$ linear or branched alkyl group; and X' is an independently selected chlorine atom, an alkoxy (—OR) group, an alkylamino (—NHR or —NR$_2$) group or a dialkyliminoxy (—O—N=CR$_2$) group wherein R is independently a C$_1$-C$_{22}$ linear or branched alkyl group, and two R groups may form a cyclic amine or cyclic ketoxime, and the integer a is 0. In the general formula (A), —C$_3$H$_6$— includes —(CH$_2$)$_3$—, —CH$_2$—CH(CH$_3$)— and —C(CH$_3$)$_2$—.

The hydrolysable group, X', of general formula (A) may be independently selected and is exemplified by groups of the following formulas: alkoxy or alkoxy substituted alkoxy groups such as methoxy, ethoxy, propoxy and methoxyethoxy groups, acyloxy groups such as acetoxy, propionyloxy and benzoyloxy groups, alkenyloxy groups such as isopropenyloxy and isobutenyloxy groups, iminoxy groups such as dimethyl ketoximo, methyl ethyl ketoximo, diethyl ketoximo, cyclohexanoximo groups, substituted amino groups such as methylamino, ethylamino, dimethylamino, diethylamino, pyrrolidino and pyperidino groups, amido groups such as N-methyl acetamido and N-ethylamido groups, substituted aminoxy groups such as dimethyl aminoxy and diethyl aminoxy groups, halogen, such as chloro and so on.

Among such hydrolysable groups, the acyloxy, iminoxy, alkoxy and dialkylamino groups such as acetoxy (—OAc), dimethylketoximo (—ON=CMe$_2$), methoxy (—OCH$_3$), ethoxy (—OC$_2$H$_5$), dimethylamino (—N(CH$_3$)$_2$), diethylamino (—N(C$_2$H$_6$)$_2$) and di-i-propylamino (—N(i-C$_3$H$_7$)$_2$) are preferable and methoxy (—OCH$_3$) and dimethylamino (—N(CH$_3$)$_2$) are particularly preferable. Even more preferred is dimethylamino (—N(CH$_3$)$_2$). Such hydrolysable groups can be contained in the organosilicon compound of the surface treatment composition of the present invention as one species or as a combination of two or more species.

The content of the fluorine-containing compound represented by the general formula (C) is 1.0 mol % or more based on the surface treatment composition.

The content of the fluorine-containing compounds represented by the general formula (B) and (C) is preferably less than 15 mol %.

In the general formulas (A) and (C), p is 1 and X is oxygen, which represents the general formulas (i-d) and (i-c-d), respectively:

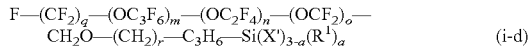  (i-d)

wherein q, m, n, o, a, r, X' and R$^1$ are the same as described above,

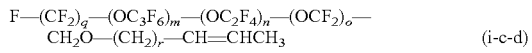  (i-c-d)

wherein q, m, n, o and r are the same as described above.

Preferentially, in the general formulas (A), (B), (C) and (i-c-d), q is 3, m is an integer from 10 to 200, n is 1, o is 0, p is 1, X is oxygen, r is 0 and a is 0 or 1.

In the general formula (A), the sum of m, n, and o is preferably 5 or greater, and particularly preferably 10 or greater. X is preferably oxygen and r is preferably 0. In the general formula (A), a is preferably 0.

The present invention also provides a process for producing the surface treatment composition containing the organosilicon compound, which comprises the steps of:

(a) an alcohol formation reaction of a raw material mixture comprising an acid fluoride compound represented by the general formula (i):

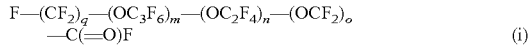  (i)

wherein q, m, n, o and a are the same as described above, and the fluorine-containing polymer represented by the general formula (ii):

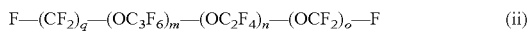  (ii)

wherein q, m, n and o are the same as described above, to obtain a reaction mixture which comprises thus formed alcohol represented by the general formula (i-b)

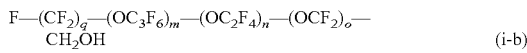  (i-b)

wherein q, m, n, and o are the same as described above, and the fluorine-containing compound represented by the general formula (ii);

(b) a purification step of the reaction mixture obtained in the step (a) by column chromatography to remove at least part of the fluorine-containing compound represented by the general formula (ii);

(c) subjecting the purified material obtained in the step (b) to an allylation reaction with a compound represented by the general formula Z—(CH$_2$)$_r$—CH$_2$CH=CH$_2$: wherein Z and r are the same as described above, to obtain a reaction mixture which comprises thus generated compound represented by the following general formula (i-c):

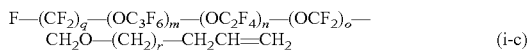  (i-c)

wherein q, m, n, o and r are the same as described above, and the fluorine-containing compound represented by the general formula (ii);

(d) subjecting the reaction mixture obtained in the step (c) to a hydrosilylation reaction with hydrosilane compound represented by the general formula (iii):

  (iii)

wherein R$^1$, a and X' are the same as described above and an isomer reducing agent, and then, if necessary, to (d-1) an alkoxylation reaction in the presence of a neutralizing agent with an aliphatic alcohol, or to (d-2) an alkoxylation reaction with a metal alkoxide having an alkoxyl group, to obtain a reaction mixture comprising:
an organosilicon compound represented by the general formula (i-d):

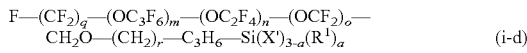  (i-d)

wherein q, m, n, o, r, a, X' and R$^1$ are the same as described above, and
fluorine-containing compounds represented by the general formulas (ii) and (i-c-d):

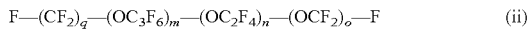  (ii)

wherein q, m, n and o are the same as described above,

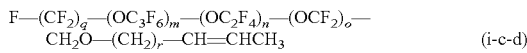  (i-c-d)

wherein q, m, n, o and r are the same as described above, wherein the content of fluorine-containing compounds represented by the general formulas (ii) and (i-c-d) in the surface treatment composition is less than 25 mol % (on the total amount).

In the step (a), the raw material mixture generally comprises not only the acid fluoride compound represented by the formula (i):

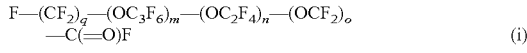  (i)

wherein q, m, n and o are the same as described above, but also the compound represented by the general formula (ii). In the raw material mixture, a ratio of the compound represented by the general formula (i) is, for example, about 45 to 85 mol %, and typically about 65 to 75 mol %, a ratio of the compound represented by the general formula (ii) is, for example, about 25 to 35 mol %, and typically about 25 to 30 mol % (with the proviso that they do not exceed 100 mol % in total). Since the compound represented by the general formula (i) has a boiling point close to that of the compound represented by the general formula (ii), it is very difficult to distill off the compound of the general formula (ii) by subjecting the raw material mixture to a distillation operation. Therefore, in the reaction mixture in the step (a) contains the compound of the general formula (ii), which is to be purified in the next purification step (b).

The alcohol forming reaction is conducted in the presence of a reducing agent, such as $NaBH_4$, diborane complex and $LiAlH_4$. The reaction is conducted preferably in a non-protic solvent, especially, in an ether solvent such as diglyme (diethylene glycol dimethyl ether), tetrahydrofuran, toluene, xylene and hydrofluoroether. The molar ratio of the reducing agent to the acid fluoride compound represented by the general formula (i) is 0.9-4.0, preferably 1.0-2.0, more preferably 1.05-1.5. The reaction temperature is in the range of 10-250° C., preferably 20-200° C., more preferably 40-150° C. The reaction time is 1-24 hours, preferably 3-20 hours, more preferably 5-12 hours.

In the step (b), the reaction mixture obtained in the step (a) is subjected to a purifying operation using column chromatography. Since the alcohol of the general formula (i-b):

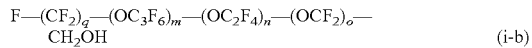
$$F\text{---}(CF_2)_q\text{---}(OC_3F_6)_m\text{---}(OC_2F_4)_n\text{---}(OCF_2)_o\text{---}CH_2OH \quad (i\text{-}b)$$

wherein q, m, n, and o are the same as described above, has a different polarity from that of the compound of the general formula (ii), the compound of the general formula (ii) can be removed off by the use of column chromatography. By such purifying operation, the compound represented by the general formula (ii) is at least partially removed, and the purified material in which a content of the compound represented by the general formula (i-b) in the purified material is higher than a content in the above reaction material is obtained. In the purified material, a ratio of the compound represented by the general formula (i-b) is, for example, about 80 to 100 mol %, and typically about 90 to 100 mol %, a ratio of the compound represented by the general formula (ii) is, for example, about 0 to 20 mol %, and typically about 0 to 10 mol % (with the proviso that they do not exceed 100 mol % in total), but the present invention does not limited to these.

The purification operation may be conducted by column filled with a material such as a solid absorbent, for example, silica gel, surface modified silica gel, active alumina, and magnesium oxide. A solvent for the reaction mixture is, for example, fluorocarbon and hydrofluoroether, and an elution solvent is, for example, hydrofluorocarbon-based fluids such as Vertrel®, perfluorohexane and hydrofluoroether such as HFE®.

In the step (c), the purified material obtained in the above step (b) is subjected to an allylation reaction with a compound represented by the general formula $Z\text{---}(CH_2)_r\text{---}CH_2CH\text{=}CH_2$: wherein Z and r are the same as described above, to obtain a reaction mixture which comprises thus generated compound represented by the general formula (i-c):

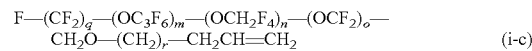
$$F\text{---}(CF_2)_q\text{---}(OC_3F_6)_m\text{---}(OCH_2F_4)_n\text{---}(OCF_2)_o\text{---}CH_2O\text{---}(CH_2)_r\text{---}CH_2CH\text{=}CH_2 \quad (i\text{-}c)$$

wherein q, m, n, o and r are the same as described above, and the fluorine-containing compound represented by the general formula (ii).

In the allylation reaction, hydrogen halide is liberated, therefore, in order to accelerate the reaction, an alkaline material such as an inorganic or organic base is preferably used. Examples of the base are NaOH, KOH, $Et_3N$, i-$Pr_3N$, n-$Bu_3N$, i-$Bu_3N$, t-$Bu_3N$, and n-$Octyl_3N$. The reaction is conducted using a solvent, for example, hydrofluorocarbon, hydrofluoroether and 1,3bis-trifluoromethylbenzene. The reaction temperature is in the range of 20-120° C., preferably 40-90° C., more preferably 50-80° C. The reaction time is 1-24 h, preferably 3-20 h, more preferably 5-12 h.

In the step (d), the reaction mixture obtained in the step (c) is subjected to a hydrosilylation reaction with hydrosilane compound represented by the general formula (iii):

$$H\text{---}Si(X')_{3-a}(R^1)_a \quad (iii)$$

wherein $R^1$, a, and X' are the same as described above, and an isomer reducing agent in the presence of a transition metal catalyst. Among the reaction mixture in the step (c), only the terminal olefinic compound represented by the general formula (i-c):

$$F\text{---}(CF_2)_q\text{---}(OC_3F_6)_m\text{---}(OC_2F_4)_n\text{---}(OCF_2)_o\text{---}CH_2O\text{---}(CH_2)_r\text{---}CH_2CH\text{=}CH_2 \quad (i\text{-}c)$$

wherein q, m, n, o and r are the same as described above, can react with the hydrosilane compound, and then, if necessary, after (d-1) the alkoxylation in the presence of a neutralizing agent with a $C_1$-$C_{22}$ linear or branched aliphatic alcohol, or (d-2) an alkoxylation with an alkali metal alkoxide having a $C_1$-$C_{22}$ linear or branched aliphatic alkoxyl group; the organosilicon compound represented by the general formula (i-d):

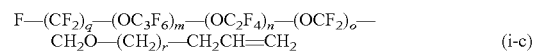
$$F\text{---}(CF_2)_q\text{---}(OC_3F_6)_m\text{---}(OC_2F_4)_n\text{---}(OCF_2)_o\text{---}CH_2O\text{---}(CH_2)_r\text{---}C_3H_6\text{---}Si(X^1)_{3-a}(R^1)_a \quad (i\text{-}d)$$

wherein q, m, n, o, r, a, X' and $R^1$ are the same as described above, is obtained.

It is particularly preferable that hydrosilylation reaction is conducted between trichlorosilane and a compound represented by the general formula (i-c) in the presence of an isomer reducing agent and a transition metal catalyst. And then, if necessary, the hydrosilylation can be followed by dehydrochlorination by alcohol (for example, methanol, ethanol: alkoxylation reaction) resulting in the formation of the organosilicon compound (i-d) having a trialkoxysilane terminal.

A preferable compound is produced according to the following reaction schemes.

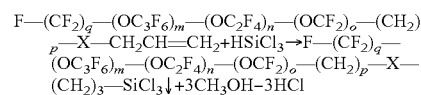

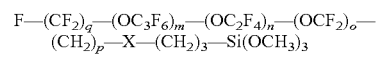

In the reaction scheme above, q is an integer from 1 to 3; m, n, and o are independently integers from 0 to 200; p is 1 or 2; X is oxygen, or a bivalent organic group. Other preferable compounds are prepared by substituting HSi (OMe)$_3$ or HSi(OEt)$_3$ for HSiCl$_3$ in the above reaction scheme with the added advantage of not requiring dehydrochlorination as a second step.

The dehydrochlorication is preferably conducted by using alkylamine (for example, mono- or di-methylamine, monoor di-ethylamine or mono- or di-isopropylamine: amination reaction) resulting in the formation of the organosilicon compound (i-d) having a tris(alkylamino)silyl terminal.

Specifically, a particularly preferable compound is produced according to the following reaction schemes.

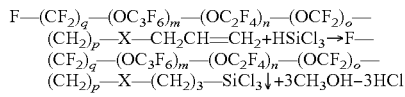

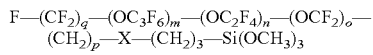

In the reaction scheme above, q, m, n, o, p and X are the same as described above.

In case of alkoxylation, the use of acid acceptors such as sodium methoxide or trimethylortho-formate are preferred to facilitate the dehydrochlorination. On the other hand, in case of amination, alkylamine itself works as an acid acceptor, therefore, the amount of alkylamine should be more than 2 molar equivalents of chlorine atom.

The catalytic Group VIII transition metals in hydrosilylation are preferably platinum or rhodium. Most preferred is platinum. It is preferred to supply platinum as chloroplatinic acid or as a platinum complex with 1,3-divinyl-1,1,3,3-tetramethyldisiloxane or rhodium as tris-(triphenylphosphino)Rh$^1$Cl.

An isomer reducing agent is also used during the hydrosilylation step. In certain embodiments, the isomer reducing agent comprises a carboxylic acid compound. The carboxylic acid compound may comprise (a) a carboxylic acid, (b) an anhydride of a carboxylic acid, (c) a silylated carboxylic acid, and/or (d) a substance that will produce the above-mentioned carboxylic acid compounds (i.e., (a), (b), and/or (c)) through a reaction or decomposition in the reaction of the method. It is to be appreciated that a mixture of one or more of these carboxylic acid compounds may be utilized as the isomer reducing agent. For example, a silylated carboxylic acid may be utilized in combination with an anhydride of a carboxylic acid as the isomer reducing agent. In addition, a mixture within one or more types of carboxylic acid compounds may be utilized as the isomer reducing agent. For example, two different silylated carboxylic acids may be utilized in concert, or two silylated carboxylic acids may be utilized in concert with an anhydride of a carboxylic acid.

When the isomer reducing agent comprises (a) carboxylic acid, any carboxylic acid having carboxyl groups may be utilized. Suitable examples of carboxylic acids include saturated carboxylic acids, unsaturated carboxylic acids, monocarboxylic acids, and dicarboxylic acids. A saturated or unsaturated aliphatic hydrocarbon group, aromatic hydrocarbon group, halogenated hydrocarbon group, hydrogen atom, or the like is usually selected as the portion other than the carboxyl groups in these carboxylic acids. Specific examples of suitable carboxylic acids include saturated monocarboxylic acids such as formic acid, acetic acid, propionic acid, n-butyric acid, isobutyric acid, hexanoic acid, cyclohexanoic acid, lauric acid, and stearic acid; saturated dicarboxylic acids such as oxalic acid and adipic acid; aromatic carboxylic acids such as benzoic acid and paraphthalic acid; carboxylic acids in which the hydrogen atoms of the hydrocarbon groups of these carboxylic acids have been substituted with a halogen atom or an organosilyl group, such as chloroacetic acid, dichloroacetic acid, trifluoroacetic acid, para-chlorobenzoic acid, and trimethylsilylacetic acid; unsaturated fatty acids such as acrylic acid, methacrylic acid, and oleic acid; and compounds having hydroxy groups, carbonyl groups, or amino groups in addition to carboxyl groups, namely, hydroxy acids such as lactic acid, keto acids such as acetoacetic acid, aldehyde acids such as glyoxylic acid, and amino acids such as glutamic acid.

When the isomer reducing agent comprises (b) anhydrides of carboxylic acids, suitable examples of anhydrides of carboxylic acids include acetic anhydride, propionic anhydride, and benzoic anhydride. These anhydrides of carboxylic acids may be obtained via a reaction or decomposition in the reaction system include acetyl chloride, butyryl chloride, benzoyl chloride, and other carboxylic acid halides, carboxylic acid metal salts such as zinc 10 acetate and thallium acetate, and carboxylic esters that are decomposed by light or heat, such as (2-nitrobenzyl) propionate.

In embodiments where the isomer reducing agent comprises (c) a silylated carboxylic acid, suitable examples of silylated carboxylic acids include trialkylsilylated carboxylic acids, such as trimethylsilyl formate, trimethylsilyl acetate, triethylsilyl propionate, trimethylsilyl benzoate, and trimethylsilyl trifluoroacetate; and di-, tri-, or tetracarboxysilylates, such as dimethyldiacetoxysilane, diphenyldiacetoxysilane, methyltriacetoxysilane, ethyltriacetoxysilane, vinyltriacetoxysilane, di-t-butoxydiacetoxysilane, and silicon tetrabenzoate.

The isomer reducing agent is typically utilized in an amount of from 0.001 to 20, alternatively from 0.01 to 5, alternatively from 0.01 to 1 weight percent, based on the total amount of the terminal olefinic compound represented by the general formula (i-c). Examples of commercially available silylated carboxylic acids suitable as the isomer reducing agent are DOW CORNING® ETS 900 and XIAMETER® OFS-1579 Silane, available from Dow Corning Corporation of Midland, Mich.

The hydrosilylation reaction proceeds by reacting a compound described by general formula (i-c) for an appropriate time interval and temperature with an excess of silicon hydride in the presence of an isomer reducing agent and sufficient transition metal catalyst to drive the reaction to completion. As an option, an appropriate solvent may be added to facilitate mixing. Various instrumental methods such as Nuclear Magnetic Resonance or infrared spectroscopy are used to monitor reaction progress. For example, preferred conditions are 30-90° C. for 1-10 hours with 1.05-30 mol of trichlorosilane per mol of fluorine compound using 0.001-10 mmol of Pt supplied as a Platinum complex with 1,3-divinyl-1,1,3,3-tetramethyldisiloxane catalyst, i.e., a group VIII transition metal and 0.01 to 1 weight percent of an isomer reducing agent based on amount of the fluorine compound (i-c). Any excess of silicon hydride can easily be removed from the reaction product by vacuum distillation.

If trichlorosilane is used for the hydrosilylation, the second reaction (alkoxylation) is preferably conducted by reacting a 0.05-10 molar excess of a mixture of trimethylorthoformate and methanol at 30-70° C. for 1-10 hours per mol of the compound obtained in the first reaction. Various instrumental methods such as Nuclear Magnetic Resonance or Infrared spectroscopy can be used to monitor reaction progress. Any excess of trimethylorthoformate and methanol can easily be removed from the reaction product by vacuum distillation. In case of the amination as a second reaction, more than 6 molar equivalent excess of the alkylamine are necessary, since 3 molar equivalent amine is for replacement reaction of chlorine atoms and further 3 molar equivalent amine is for the neutralization of the eliminated 3 molar equivalent HCl per 1 mole of SiCl$_3$.

The fluorine-containing compounds represented by the general formula (ii):

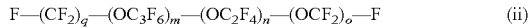

$$F-(CF_2)_q-(OC_3F_6)_m-(OC_2F_4)_n-(OCF_2)_o-F \quad \text{(ii)}$$

wherein q, m, n and o are the same as described above, cannot react with the hydrosilane compound. Therefore, it remains unreacted in the reaction mixture.

In the hydrosilylation reaction, it was found that some part of the terminal olefinic compound represented by the general formula (i-c) is isomerized to an inner olefinic compound represented by the general formula (i-c-d):

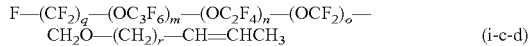

$$F-(CF_2)_q-(OC_3F_6)_m-(OC_2F_4)_n-(OCF_2)_o-CH_2O-(CH_2)_r-CH=CHCH_3 \quad \text{(i-c-d)}$$

wherein q, m, n, o and r are the same as described above. The reactivity of this inner-olefinic compound toward the hydrosilane compound is very low. Therefore, this compound generally remains unreacted in the reaction mixture, and may decrease the durability property. The amount of the inner-olefinic compound (i-c-d) by-product from the hydrosilylation step can be around 10 to 20 mol % based on the surface treatment composition.

Therefore, in the present invention, the total content of the fluorine-containing compounds (B)+(C) or (ii)+(i-c-d) should be controlled to be less than 25 mol % based on the surface treatment composition.

The surface treatment composition according to the present invention may include any suitable other component(s) such as a coupling agent, an antistatic agent, an ultraviolet absorber, a plasticizer, a leveling agent, a pigment, a catalyst and so on.

According to another mode of the present invention, there is provided a surface-treated article, which comprises
   a base material, and
   a layer (or a thin film) formed by the surface treatment composition of the present invention on a surface of the base material.

The layer formed by the surface treatment composition on the surface of the base material has good antifouling (or soil resistant) properties and high durability. Further, since this layer shows a high transmittance such as light transmittance and transparency, the surface treatment composition of the present invention is suitable to the use for optic materials which require transmittancy.

Optional catalysts can be used, if needed, to promote surface modification by the surface treatment composition of the present invention. These catalysts promote the reaction between the organosilicon functional group and the surface of the base material. They can be used alone or as a combination of two or more species to form the surface modifier of the present invention. Examples of suitable catalytic compounds include acids, bases, metal salts of organic acids such as dibutyl tin dioctoate, iron stearate, lead octoate and others, titanate esters such as tetraisopropyl titanate, tetrabutyl titanate, chelate compounds such as acetylacetonato titanium and the like. It is preferred to use an amount of the optional catalyst in the range of 0 to 5 parts by weight, more preferably 0.01 to 2 parts by weight based on 100 parts by weight of the surface treatment composition of the present invention.

The surface treatment composition of the present invention may contain a liquid medium such as an organic solvent. The concentration of the surface treatment composition including the organosilicon compound and the fluorine compounds is preferably 0.01 to 80% by weight. The organic solvent may be various solvents which preferably dissolve the surface treatment composition provided that the organic solvent does not react with components (particularly, the reactive organic silicon compound) contained in the composition of the present invention. Examples of the organic solvent include a fluorine-containing solvent such as a fluorine-containing alkane, a fluorine-containing haloalkane, a fluorine-containing aromatics and a fluorine-containing ether (for example, hydrofluoroether (HFE)).

The material to be treated with the surface treatment composition of the invention to form a surface-treated layer is not particularly limited. Examples thereof include optical members comprising: inorganic materials such as glass plates, glass plates comprising an inorganic layer, ceramics, and the like; and organic materials such as transparent plastic materials and transparent plastic materials comprising an inorganic layer; etc. Optical members which could comprise such material are not limited, and as example we could mention antireflective films, optical filters, optical lenses, eyeglass lenses, beam splitters, prisms, mirrors, etc.

Examples of inorganic materials include glass plates. Examples of inorganic compounds for forming glass plates comprising an inorganic layer include metal oxides (silicon oxides (silicon dioxide, silicon monoxide, etc.), magnesium oxide, titanium oxide, tin oxide, zirconium oxide, sodium oxide, antimony oxide, indium oxide, bismuth oxide, yttrium oxide, cerium oxide, zinc oxide, ITO (indium tin oxide) and the like.

The inorganic layer or inorganic material comprising such an inorganic compound may be single- or multi-layered. The inorganic layer acts as an antireflective layer, and can be formed by known methods such as wet coating, PVD (Physical Vapor Deposition), CVD (Chemical Vapor Deposition), and like methods. Examples of wet coating methods include dip coating, spin coating, flow coating, spray coating, roll coating, gravure coating, and like methods. Examples of PVD methods include vacuum evaporation, reactive deposition, ion beam assisted deposition, sputtering, ion plating, and like methods.

Among organic materials, examples of transparent plastic materials include materials comprising various organic polymers. From the view point of transparency, refractive index, dispersibility and like optical properties, and various other properties such as shock resistance, heat resistance and durability, materials used as optical members usually comprise polyolefins (polyethylene, polypropylene, etc.), polyesters (polyethyleneterephthalate, polyethylenenaphthalate, etc.), polyamides (nylon 6, nylon 66, etc.), polystyrene, polyvinyl chloride, polyimides, polyvinyl alcohol, ethylene vinyl alcohol, acrylics, celluloses (triacetylcellulose, diacetylcellulose, cellophane, etc.), or copolymers of such organic polymers. These materials can be mentioned as examples of transparent plastic materials to be treated in the invention. More particularly these materials may be comprised to optical components like ophthalmic elements. Non-limiting examples of ophthalmic elements include corrective and non-corrective lenses, including single vision or multi-vision lenses like bifocal, trifocal and progressives lenses, which may be either segmented or non-segmented, as well as other elements used to correct, protect, or enhance vision, including without limitation contact lenses, intra-ocular lenses, magnifying lenses and protective lenses or visors. Preferred material for ophthalmic elements comprises one or more polymers selected from polycarbonates, polyamides, polyimides, polysulfones, polyethylene terephthalate and polycarbonate copolymers, polyolefins, especially polynorbornenes, diethylene glycol-bis(allyl carbonate) polymers—known as CR39—and copolymers, (meth)acrylic polymers and copolymers, especially (meth)acrylic polymers and copolymers derived from bisphenol A, thio(meth)acrylic polymers and copolymers, urethane and thiourethane polymers and copolymers, epoxy polymers and copolymers, and episulfide polymers and copolymers.

Examples of materials include those prepared by adding known additives such as antistatic agents, UV absorbers, plasticizers, lubricants, coloring agents, antioxidants, flame retardants, etc. to the organic polymers of these organic materials.

The material to be used in the invention may be a material prepared by forming an inorganic layer on an organic material. In this case, the inorganic layer acts as an antireflective layer and can be formed on an organic material by methods as mentioned above.

The inorganic material or organic material to be treated is not particularly limited. Transparent plastic materials used as optical members are usually in the form of films or sheets. Such materials in the form of films or sheets may also be used as the material of the invention. A material in the form of a film or sheet may be a monolayer or a laminate of a plurality of organic polymers. The thickness is not particularly limited but is preferably 0.01 to 5 mm.

The material having a hard coat layer between the transparent plastic material and the inorganic layer can be used for the base material of the present invention. The hard coat layer improves the hardness of the material surface and also flattens and smoothens the surface of the material, thus improving the adhesion between the transparent plastic material and the inorganic layer. Therefore, scratching caused by pencils or like loads can be prevented. Moreover, the hard coat layer can inhibit cracking in the inorganic layer caused by the bending of the transparent plastic material, thus improving the mechanical strength of the optical member.

The material of the hard coat layer is not particularly limited so long as it has transparency, appropriate hardness, and mechanical strength. For example, thermosetting resins and resins cured by ionizing radiation or ultraviolet radiation are UV-curing acrylic resins and organic silicon resins, and thermosetting polysiloxane resins are particularly preferable. The refractive index of such resins is preferably equivalent to or close to that of the transparent plastic material.

Materials as mentioned above can be used as the transparent material of the antireflective optical member of the invention. In particular, such materials comprising an antireflective layer on the surface can be transparent materials comprising an antireflective layer. An antireflective optical member of the invention can be obtained by forming an antifouling layer on the surface of such a material.

In addition to such optical members, the surface treatment composition of the invention can be applied to window members for automobiles or airplanes, thus providing advanced functionality. To further improve surface hardness, it is also possible to perform surface modification by a so-called sol-gel process using a combination of the surface treatment composition of the invention and TEOS (tetraethoxysilane).

By using the surface treatment composition of the invention as a mold release agent in a nanoimprinting process, precise mold release can be easily achieved. When the surface is treated with the surface treatment composition of the invention, the treatment composition diffuses almost to the state of a monolayer, so that the resulting layer has a thickness of only several nanometers. In spite of such a thickness, it is possible to form a surface with a water contact angle of 110° or more as shown later in the Examples.

The surface treatment composition of the invention has excellent liquid repellency and thus can be applied to lithography and device formation.

Furthermore, by treating the surface of ceramic materials, it is also possible to produce easily maintained sanitary wares and exterior walls.

The method of forming a treated layer is not particularly limited. For example, wet coating methods and dry coating methods can be used.

Examples of wet coating methods include dip coating, spin coating, flow coating, spray coating, roll coating, gravure coating, and like methods.

Examples of dry coating methods include vacuum evaporation, sputtering, CVD, and like methods. Specific examples of vacuum evaporation methods include resistive heating, electron beam, high-frequency heating, ion beam and like methods. Examples of CVD methods include plasma-CVD, optical CVD, heat CVD, and like methods.

Moreover, coating by atmospheric pressure plasma methods is also possible.

When using wet coating methods, diluent solvents are not particularly limited. In view of stability and volatility of the composition, the following compounds are preferable: perfluoroaliphatic hydrocarbons having 5 to 12 carbon atoms, such as perfluorohexane, perfluoromethylcyclohexane, and perfluoro-1,3-dimethylcyclohexane; polyfluorinated aromatic hydrocarbons such as bis(trifluoromethyl)benzene; polyfluorinated aliphatic hydrocarbons, perfluorobutyl methyl ether and like HFEs, etc. Such a solvent can be used singly or as a mixture of two or more.

A wet coating method is preferably used for materials having complicated shapes and/or large areas.

On the other hand, in consideration of the work environment at the time of forming an antifouling layer, dry coating methods, which do not require diluent solvents, are preferable. Vacuum evaporation methods are particularly preferable.

After forming an antifouling layer on the material by a dry or wet coating method, if necessary, heating, humidification, catalytic post treatment, photoirradiation, electron beam irradiation, etc. may be performed.

The thickness of the antifouling layer formed by using the antifouling agent of the invention is not particularly limited. A range of 1 to 30 nm is preferable in terms of antifouling properties, more preferably 1 to 10 nm, anti-scratching properties and optical performance of the optical member.

The present invention is further explained specifically by the following examples, but the present invention is not limited to these examples.

A composition of the organosilicon compound or the fluorine-containing compound in the present description is analyzed as follows.

Polymer Composition (by 1H-NMR, 19F-NMR, IR)

An average molecular weight is calculated from the results of $^{19}F$ NMR measurement and molar ratios (mol %) of the respective components in a mixture are calculated from the results of $^1H$ NMR measurement. The "average molecular weight" throughout the present description means a number average molecular weight.

A yield is calculated with the proviso that an ideal case with respect to both precursors of an organosilicon compound and a fluorine-containing compound are set at 100% wherein the all of the precursor of a reactive fluorine-containing compound is converted into an aimed reaction product.

EXAMPLES

Example 1

The present example relates to a surface treatment composition according to the present invention described above and to a process for producing the same.

Step (a):

A raw material mixture used was a mixture of 700 g (0.175 mole) of ω-fluoro polyperfluorooxetane acyl fluoride (average molecular weight: 4000) represented by the following chemical formula:

$$F-(CF_2CF_2CF_2O)_n-CF_2CF_2-COF$$

and 300 g (0.075 mole) of perfluoropolyoxetane (average molecular weight: 4200) represented by the following chemical formula:

$$F-(CF_2CF_2CF_2O)_n-CF_2CF_3$$

Under a nitrogen gas stream, a 3.0 L four-neck flask equipped with a stirrer, a dropping funnel, a refluxing condenser and a thermometer was charged with 330 g of diglyme, and 11.4 g (0.3 mole) of $NaBH_4$ was added thereto with stirring. The raw material mixture described above was added dropwise thereto at a rate of 10 mL/min. After completion of the dropwise addition, the temperature of the liquid phase was raised to about 110° C. and a reaction was allowed to proceed for 8 hours at this reaction temperature. After the reaction, the flask content was cooled to 40° C. or less, 700 g of perfluorohexane was added thereto followed by stirring for 10 minutes. It was further cooled to 5° C. or less, 140 mL of ion-exchanged water was added dropwise. Then, after 1000 g of a 3N—HCl solution was added dropwise, the liquid phase was separated into two (upper and lower) phases with the use of a separating funnel, and the lower phase (organic phase) was obtained separately. Thus obtained organic phase was washed with a 3N—HCl solution/acetone (340 g/340 g) three times. As a result of completely removing a volatile portion by distillation under a reduced pressure, 950 g (yield 95%) of a reaction mixture was obtained.

According to IR analysis of the obtained reaction mixture, the absorption at 1890 cm$^{-1}$ derived from —C(=O)F disappeared completely, and the absorption at 3300 cm$^{-1}$ derived from —$CH_2OH$ newly appeared. Therefore, the reaction mixture was recognized as a mixture of perfluoropolyoxetane alcohol represented by the following chemical formula:

$$CF_3CF_2CF_2-(OCF_2CF_2CF_2)_a-O-CF_2CF_2-CH_2OH$$

and perfluropolyoxetane represented by the following chemical formula:

$$CF_3CF_2CF_2-(OCF_2CF_2CF_2)_a-O-CF_2CF_3$$

In this reaction mixture, the content of perfluoropolyoxetane alcohol (average molecular weight 4000) was 70 mol %, and the content of perfluoropolyoxetane (average molecular weight 4200) was 30 mol %.

Step (b): Purification Step by Chromatography:

The reaction mixture obtained from the step (a) was subjected to chromatography separation by by column filled with silica gel (solvent: Vertrel XF from DuPont), and thereby 660 g (purity 98 mol %) of a purified material substantially consisting of perfluoropolyoxetane alcohol represented by the chemical formula below was obtained:

$$CF_3CF_2CF_2-(OCF_2CF_2CF_2)_a-O-CF_2CF_2-CH_2OH$$

In the purified material, the content of perfluoropolyoxetane represented by the chemical formula below was 2 mol %:

$$CF_3CF_2CF_2-(OCF_2CF_2CF_2)_a-O-CF_2CF_3$$

Step (c): Allylation Reaction:

Under a nitrogen gas stream, to a 3.0 L four-neck flask equipped with a stirrer, a dropping funnel, a refluxing condenser and a thermometer was added 500 g (0.125 mol) of a mixture ($CF_3CF_2CF_2-(OCF_2CF_2CF_2)_a-O-CF_2CF_2-CH_2OH/CF_3CF_2CF_2-(OCF_2CF_2CF_2)_a-O-CF_2CF_3$=98 mol %/2 mol %), and 300 g of 1,3-bis(trifluoromethyl)benzene was added thereto with stirring. After adding 10 g (0.25 mol) of sodium hydrate, the temperature of the liquid phase was raised to about 65° C. and a reaction was allowed to proceed for 4 hours at this reaction temperature. After 4 hours, 30 g (0.24 mol) of allylbromide was added. After addition of allylbromide, the reaction was allowed to proceed for 8 hours at 65° C. After the reaction, the flask content was cooled to 40° C. or less, and 200 g of perfluorohexane was added thereto followed by stirring for 10 minutes. It was further cooled to 5° C. or less, 150 g of 3N—HCl solution was added dropwise, the liquid phase was separated into two (upper and lower) phase with the use of a separating funnel, and the lower phase (organic phase) was obtained separately. Thus obtained organic phase was washed with 3N—HCl solution/acetone (150 g/150 g) three times. As a result of complete removing of a volatile portion by distillation under a reduced pressure, 480 g (yield 96%) of a reaction mixture was obtained.

According to 1H-NMR and 19F-NMR analyses, the obtained reaction mixture was recognized as a mixture of $CF_3CF_2CF_2(OCF_2CF_2CF_2)_{22}OCF_2CF_2CH_2OCH_2CH=CH_2$ and $CF_3CF_2CF_2(OCF_2CF_2CF_2)_{22}OCF_2CF_3$ (the ratio is 98 mol %/2 mol %).

Step (d)(1): Silylation by Trichlorosilane Then Alkoxylation:

To a 300 mL 3 neck flask equipped with magnetic stir bar, water cooled reflux condenser, temperature control and dry nitrogen headspace purge was added 80.0 g of $CF_3CF_2CF_2(OCF_2CF_2CF_2)_xOCF_2CF_2CH_2OCH_2CH=CH_2$ and $CF_3CF_2CF_2(OCF_2CF_2CF_2)_xOCF_2CF_3$ (mixture ratio is 98 mol %/2 mol %, FW 4521 g/mole), 40.0 g of 1,3-bis(trifluoromethyl)benzene, 0.24 g of Dow Corning® ETS 900 and 4.06 g of trichlorosilane. The contents were heated to 60° C. before the incremental addition over 80 minutes of Pt metal complexed with 1,3-divinyl-1,1,3,3-tetramethyl-disiloxane. The contents were maintained at 65° C. for an additional 120 minutes to make the mixture of $CF_3CF_2CF_2(OCF_2CF_2CF_2)_xOCF_2CF_2CH_2OCH_2CH_2CH_2SiCl_3$, $CF_3CF_2CF_2(OCF_2CF_2CF_2)_xOCF_2CF_2CH_2OCH=CHCH_3$ and $CF_3CF_2CF_2(OCF_2CF_2CF_2)_xOCF_2CF_3$. The residual trichlorosilane and solvent were vacuum stripped from the reaction mixture before addition of 10.0 g of trimethylorthoformate, 10.0 g of methanol and 20.0 g of 1,3-bis(trifluoromethyl)benzene. The contents of the flask were maintained at 60° C. for 3 hours to facilitate methoxylation of the chlorosilane. Excess reagent was removed under vacuum. Activated carbon, 4.0 g, was added. The product was filtered through a bed of Celite filter aid on a 0.5 micron membrane. The product mixture (X), $CF_3CF_2CF_2(OCF_2CF_2CF_2)_xOCF_2CF_2CH_2OCH_2CH_2CH_2Si(OCH_3)_3$, $CF_3CF_2CF_2(OCF_2CF_2CF_2)_xOCF_2CF_2CH_2$ OCH=CHCH$_3$ and CF$_3$CF$_2$CF$_2$(OCF$_2$CF$_2$CF$_2$)$_x$OCF$_2$CF$_3$ (mixture ratio is 81 mol %/17 mol %/2 mol %), was isolated as the filtrate. Analysis by infrared and nuclear magnetic resonance spectroscopy showed the complete disappearance of CH$_2$=CHCH$_2$O and SiCl functionalities.

The following steps (i)-(iii) relate to an antifouling treatment of ophthalmic lenses and the lenses obtained thereby.

(i) Pretreatment of Ophthalmic Lenses:

The coatings are achieved on substrates which are CR39® based ophthalmic lenses comprising, on both sides, an anti-abrasion coating of the polysiloxane type corresponding to Example 3 in the Patent Publication EP614957. The lenses are washed in an ultra-sound cleaning vessel, steamed for 3 hours minimum at a temperature of 100° C. They are then ready to be treated. The treated lenses are round lenses.

(ii) Preparation of the Lenses (Preparation of the Lenses having a Non Reflecting and Hydrophobic/Oleophobic Coating:

The vacuum treating machine used is a Syrus 3 machine from Leybold Optics provided with an electron gun, an ion gun and an evaporation source with a Joule effect. The lenses are placed on a carrousel provided with circular openings intended to accommodate the lenses to be treated, the concave side facing the evaporation sources and the ion gun.

A vacuum drawing is performed until a secondary vacuum is reached.

Then, a successive evaporation is performed, with the electron gun, of 4 non reflecting optical layers, high index (IH), low index (BI), HI, BI: ZrO$_2$, SiO$_2$, ZrO$_2$, SiO$_2$.

Finally, the reaction mixture (X) obtained above hydrophobic and oleophobic coating layer is deposited through evaporation.

A given amount of the reaction mixture (X) obtained above is placed in a copper capsule with a 18 mm diameter, in turn placed in a joule effect crucible (tantalum crucible). A 1 to 5 nm thickness of hydrophobic and oleophobic coating is deposited through evaporation.

The deposited thickness is measured using a quartz monitor.

Subsequently, the enclosure is heated again and the treatment chamber is set back to atmosphere.

The lenses are then turned upside down and the convex side oriented towards the treatment area. The convex side is treated identically to the concave side (reproducing the steps (ii) above).

(iii) Tests & Measurements:

(iii-1) Durability Procedure A:

A "Microfiber M840S 30×40" from FACOL is dipped in water at 25° C. for 1 minute and then taken out into air. This Microfiber is then used to rub mechanically the surface of the plastic lens having a water repellent film 1200 times (that is, 600 cycles), 2400 times (that is, 1200 cycles), 3600 times (that is, 1800 cycles), 4800 times (that is, 2400 cycles), and 6000 times (that is, 3000 cycles), in a forward and backward movement (1 cycle correspond to one forward plus one backward movement) while applying a load of 3.5 kg. (in air of 25° C., 40 to 60% humidity), and the static contact angle is measured every 600 rubbing cycles. The mechanical rubbing equipment is set to reach the 600 cycles in 7 minutes.

(iii-2) Durability Procedure B:

A "Microfiber M840S 30×40" from FACOL is dipped in water at 25° C. for 1 minute and then taken out into air. This Microfiber is then used to rub mechanically the surface of the plastic lens having a water repellent film 2400 times (that is, 1200 cycles), 4800 times (that is, 2400 cycles), 7200 times (that is, 3600 cycles), 9600 times (that is, 4800 cycles), and 12000 times (that is, 6000 cycles), in a forward and backward movement (1 cycle correspond to one forward plus one backward movement) while applying a load of 3.5 kg. (in air of 25° C., 40 to 60% humidity), and the static contact angle is measured every 1200 rubbing cycles. The mechanical rubbing equipment is set to reach the 1200 cycles in 14 minutes.

(iii-3) Static Contact Angle to Water:

Using a contact angle meter (DSA 100, manufactured by KRUSS Advancing Surface Science), a droplet of water having a volume of 4 micro-liters is deposited on the uppermost portion of the convex side of the lens using a needle at 25° C. The angle between the droplet and the surface is defined as the "static contact angle to water". This angle is measured using the "drop shape analysis" software of the DSA 100. Using this technique and this equipment, the uncertainty on the measurement is +/−1.3°.

Example 2

A run has been performed following the process described above. Three lenses have been tested using the durability test procedure A described above and for each lens at each step 3 static contact angle measurements were performed. The table 1 shows the average value calculated using the 3 measurements done on the 3 lenses:

TABLE 1

(using durability procedure A, product mixture X)

| | Number of cycles | | | | |
|---|---|---|---|---|---|
| no cycles | 600 cycles @ 3.5 kg | 1200 cycles @ 3.5 kg | 1800 cycles @ 3.5 kg | 2400 cycles @ 3.5 kg | 3000 cycles @ 3.5 kg |
| Static contact angle (°) average on 3 lenses | | | | | |
| 120° | 112° | 112° | 112° | 112° | 113° |

Note:
"@ 3.5 kg" means the load applied for each cycle.

The Example shows that the antifouling coating is a little bit damaged after 600 cycles, however it demonstrates the very high durability of coating. Indeed the contact angle is stable from 1200 to 3000 cycles and stays at a high level.

Comparative Example 1

A product mixture (XX) was obtained according to similar procedures to Example 1, except that the step (b) was not conducted, the reaction mixture obtained from the step (a) was used for the step (c) in place of the purified material obtained from the step (b) and the reaction mixture obtained from above was used for the step (d) but Dow Corning® ETS 900 was not added.

In the product mixture (XX), the content of silane functional perfluoropolyether was 28 mol %, CF$_3$CF$_2$CF$_2$(OCF$_2$CF$_2$CF$_2$)$_{22}$OCF$_2$CF$_3$ was 30 mol % and CF$_3$CF$_2$CF$_2$(OCF$_2$CF$_2$CF$_2$)$_{22}$OCF$_2$CF$_2$CH$_2$O—CH=CHCH$_3$ was 42 mol %.

Example 3

A product mixture (XXX) was obtained according to similar procedures to Example 1. The product mixture (XXX) contained, $CF_3CF_2CF_2(OCF_2CF_2CF_2)_xOCF_2CF_2CH_2OCH_2CH_2CH_2Si(OCH_3)_3$, $CF_3CF_2CF_2(OCF_2CF_2CF_2)_xOCF_2CF_2CH_2OCH=CHCH_3$ and $CF_3CF_2CF_2(OCF_2CF_2)_xOCF_2CF_3$ (mixture ratio is 77 mol %/21 mol %/2 mol %).

The surface treated lenses were prepared according to the same procedure as Example 2, except that the reaction mixture (XX) from comparative example 1 or (XXX) from example 3 was used. The durability procedure B has been used to compare the treatments. The results are shown in Table 2.

TABLE 2

(Durability procedure B)

| | | no cycles | 1200 cycles @ 3.5 kg | 2400 cycles @ 3.5 kg | 3600 cycles @ 3.5 kg | 4800 cycles @ 3.5 kg | 6000 cycles @ 3.5 kg |
|---|---|---|---|---|---|---|---|
| Static contact angle (°) average on 3 lenses | Product mixture (XXX) | 119° | 120° | 106° | 105° | 105° | 104° |
| | Comparative example 1, Product mixture (XX) | 104° | 100° | 98° | 97° | 95° | 94° |

Note:
"@ 3.5 kg" means the load applied for each cycle.

By comparing the results of Example 2, using product mixture (XXX) and comparative example 1 (product mixture (XX)) in Table 2, it is clearly understood that the purification step (b) contributes greatly for lowering the surface energy and increasing the durability of the antifouling layer.

Example 4

A reaction mixture (YY) was obtained according to similar procedures to Example 1, except that the alkoxylation reaction in the step (d) (1) was replaced by the amination reaction as follows:

Step (d)(1): Silylation by Trichlorosilane Then Amination:

To a 100 mL 3 neck flask equipped with magnetic stir bar, water cooled reflux condenser, temperature control and dry nitrogen headspace purge was added 36.78 g of $CF_3CF_2CF_2(OCF_2CF_2CF_2)_xOCF_2CF_2CH_2OCH_2CH=CH_2$ and $CF_3CF_2CF_2(OCF_2CF_2CF_2)_xOCF_2CF_3$ (mixture ratio is 98 mol %/2 mol %, FW 4070 g/mole), 18.91 g of 1,3-bis(trifluoromethyl)benzene, 0.0879 g of Dow Corning®, ETS 900 and 7.72 g of trichlorosilane. The contents were heated to 60° C. before the incremental addition over 3.25 hours of Pt metal complexed with 1,3-divinyl-1,1,3,3-tetramethyl-disiloxane. The contents were maintained at 60° C. for an additional 30 minutes to make the mixture of $CF_3CF_2CF_2(OCF_2CF_2CF_2)_xOCF_2CF_2CH_2OCH_2CH_2CH_2SiCl_3$, $CF_3CF_2CF_2(OCF_2CF_2CF_2)_xOCF_2CF_2CH_2OCH=CHCH_3$ and $CF_3CF_2CF_2(OCF_2CF_2CF_2)_xOCF_2CF_3$. The residual trichlorosilane and solvent were vacuum stripped from the reaction mixture.

The mixture was transferred to a 250 mL 3 neck flask equipped with magnetic stir bar, dry ice ($CO_2$) cooled reflux condenser, thermometer and dry nitrogen headspace purge with 87.04 g of perfluorohexanes before condensing in 37 g of anhydrous dimethylamine which cooled the reaction mixture to 7° C. The dry ice was allowed to evaporate and the contents warmed overnight to room temperature which resulted in purging of excess dimethylamine. Activated carbon, 0.33 g, was added. The product was filtered through a bed of Celite filter aid on a 5 micron membrane. The product mixture (YY), $CF_3CF_2CF_2(OCF_2CF_2CF_2)_xOCF_2CF_2CH_2OCH_2CH_2CH_2Si(NMe_2)_3$, $CF_3CF_2CF_2(OCF_2CF_2CF_2)_xOCF_2CF_3$ and $CF_3CF_2CF_2(OCF_2CF_2CF_2)_xOCF_2CF_2CH_2OCH=CHCH_3$ (mixture ratio is 85 mol %/2 mol %/13 mol %), was isolated as the filtrate. Analysis by infrared and nuclear magnetic resonance spectroscopy showed the complete disappearance of $CH_2=CHCH_2O$ and SiCl functionalities.

Example 5

The synthesis was repeated according to the procedure of Example 1 with the exception that step (d) hydrosilylation was completed by trimethoxysilane, avoiding having to methoxylate in an additional step.

To a 100 mL 3 neck flask equipped with magnetic stir bar, water cooled reflux condenser, temperature control and dry nitrogen headspace purge was added 20.5 g of $CF_3CF_2CF_2(OCF_2CF_2CF_2)_xOCF_2CF_2CH_2OCH_2CH=CH_2$ and $CF_3CF_2CF_2(OCF_2CF_2CF_2)_xOCF_2CF_3$ (mixture ratio is 98 mol %/2 mol %, FW 4521 g/mole), 10.0 g of 1,3-bis(trifluoromethyl)benzene, 0.06 g of Dow Corning® ETS 900 and 1.94 g of trimethoxysilane. The contents were heated to 60° C. before the incremental addition over 0.5 hours of Pt metal complexed with 1,3-divinyl-1,1,3,3-tetramethyl-disiloxane. The contents were maintained at 60° C. for an additional 50 minutes to make the mixture of $CF_3CF_2CF_2(OCF_2CF_2CF_2)_xOCF_2CF_2CH_2OCH_2CH_2Si(OCH_3)_3$, $CF_3CF_2CF_2(OCF_2CF_2CF_2)_xOCF_2CF_2CH_2OCH=CHCH_3$ and $CF_3CF_2CF_2(OCF_2CF_2CF_2)_xOCF_2CF_3$. The residual trimethoxysilane and solvent were vacuum stripped from the reaction mixture before addition of 1.1 g of activated carbon. The product was filtered through a bed of Celite filter aid on a 0.5 micron membrane. The product mixture $CF_3CF_2CF_2(OCF_2CF_2CF_2)_xOCF_2CF_2CH_2OCH_2CH_2Si(OCH_3)_3$, $CF_3CF_2CF_2(OCF_2CF_2CF_2)_xOCF_2CF_2CH_2OCH=CHCH_3$ and $CF_3CF_2CF_2(OCF_2CF_2CF_2)_xOCF_2CF_3$. (mixture ratio is 81 mol %/17 mol %/2 mol %), was isolated as the filtrate. Analysis by infrared and nuclear magnetic resonance spectroscopy showed the complete disappearance of $CH_2=CHCH_2O$ functionality.

The surface treated lenses were prepared according to the same procedure as Example 2, except that the reaction mixture (YY) from Example 4 was used. Three lenses have been tested using the durability procedure B described above and for each lens at each step, 3 static contact angle measurements were performed. The table 3 shows the average value calculated using the 3 measurements done on the 3 lenses:

TABLE 3

(Durability procedure B)

| | Number of cycles | | | | |
|---|---|---|---|---|---|
| no cycles | 1200 cycles @ 3.5 kg | 2400 cycles @ 3.5 kg | 3600 cycles @ 3.5 kg | 4800 cycles @ 3.5 kg | 6000 cycles @ 3.5 kg |
| Static contact angle (°) average on 3 lenses | | | | | |
| 120° | 114° | 112° | 112° | 109° | 109° |

Note:
"@ 3.5 kg" means the load applied for each cycle.

The results in Table 3 demonstrates the very high durability of coating. Indeed the contact angle is stable from 1200 to 6000 cycles and stays at a high level.

Moreover, the optically functional member obtained by bonding the optical element or antireflection optical member of the present invention to an optical functional member, such as a deflection plate, has a treated layer with the above-mentioned excellent functionality and high durability formed on its surface, and therefore provides the display device with high image recognition of the present invention, when bonded to, for example, the front panel of the display screen of various displays (liquid crystal displays, CRT displays, projection displays, plasma displays, EL displays, etc.).

Furthermore, the treated layer formed on a material surface using the surface treatment composition of the present invention is extremely thin and thus has highly precise processability and excellent micromachining properties.

INDUSTRIAL APPLICABILITY

A surface treatment composition obtained by the present invention can be suitably used as a surface treatment agent for giving an antifouling property to a surface of various base materials, especially optic materials which require transmittancy.

The invention claimed is:

1. A surface treatment composition comprising an organosilicon compound represented by the general formula (A):

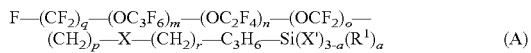

wherein q is an integer from 1 to 3; m, n, and o are independently integers from 0 to 200; p is 1 or 2; X is oxygen or a bivalent organic group; r is an integer from 0 to 17; $R^1$ is a $C_{1-22}$ linear or branched hydrocarbon group that does not have an unsaturated aliphatic bond; a is an integer from 0 to 2; and X' is hydrolysable group; wherein a total content of fluorine-containing compounds represented by the general formulas (B) and (C) in the surface treatment composition is less than 25 mol % based on the surface treatment composition, and wherein a content of the fluorine-containing compound represented by general formula (C) is at least 0.1 mol % based upon the surface treatment composition:

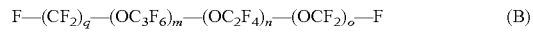

wherein q, m, n and o are the same as described above,

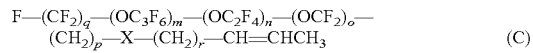

wherein q, m, n, o, p, r and X are the same as described above.

2. The surface treatment composition according to claim 1, wherein, in the general formula (A), the hydrolysable group X' is at least one selected from an alkoxy (—OR) group and an alkylamino group of (—NHR or —NR$_2$) wherein R is independently a $C_1$-$C_{22}$ linear or branched alkyl group and two R groups may form a part of a cyclic amino group, and the integer a is 0.

3. The surface treatment composition according to claim 2, wherein, in the general formula (A), the hydrolysable group X' is an alkylamino group of (—NHR or —NR$_2$) wherein R is the same as described in claim 2, and the integer a is 0.

4. The surface treatment composition according to claim 1, wherein the organosilicon compound represented by the general formula (A) is represented by a general formula (i-d-i) or (i-d-ii):

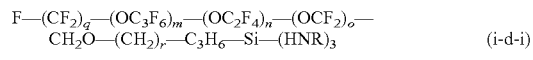

or

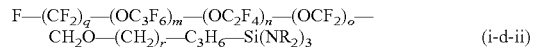

wherein q, m, n, o, r and R are the same as described in claim 1, and fluorine-containing compounds represented by the general formulas (B) and (C) are represented respectively by general formulas (ii) and (i-c-d):

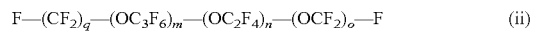

and

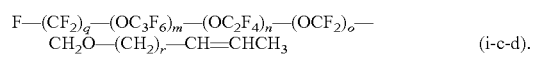

5. The surface treatment composition according to claim 1, wherein the content of the fluorine-containing compound represented by the general formula (C) is 1.0 mol % or more and less than 25 mol % based on the surface treatment composition.

6. The surface treatment composition according to claim 1, wherein the content of the fluorine-containing compounds represented by the general formulas (B) and (C) is less than 15 mol % based on the surface treatment composition.

7. The surface treatment composition according to claim 1, wherein, in the general formulas (A) and (C), p is 1 and X is oxygen, that is, (A) and (C) are represented by the general formulas (i-d) and (i-c-d), respectively:

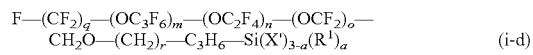

wherein q, m, n, o, r, a, X' and $R^1$ are the same as described in claim 1,

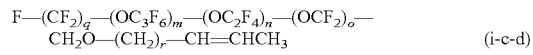

wherein q, m, n, o and r are the same as described in claim 1.

8. A surface-treated article, which comprises
a base material, and
a layer formed by applying the surface treatment composition according to claim 1 on a surface of the base material.

9. The surface-treated article according to claim 8, wherein the base material is a transparent material comprising an antireflective optical layer.

10. The surface-treated article according to claim 8 which is selected from corrective and non-corrective lenses including single vision or multi-vision lenses like bifocal, trifocal and progressives lenses, which may be either segmented or non-segmented.

* * * * *

UNITED STATES PATENT AND TRADEMARK OFFICE
CERTIFICATE OF CORRECTION

| | | |
|---|---|---|
| PATENT NO. | : 9,523,004 B2 | Page 1 of 1 |
| APPLICATION NO. | : 13/508870 | |
| DATED | : December 20, 2016 | |
| INVENTOR(S) | : Gregory Hervieu et al. | |

It is certified that error appears in the above-identified patent and that said Letters Patent is hereby corrected as shown below:

On the Title Page

Please add a line item entitled: (30) Foreign Application Priority Data, and add the following under that line item: -- November 11, 2009 (US) ..................... PCT/US2009/064016 --

Signed and Sealed this
Twenty-fifth Day of April, 2017

Michelle K. Lee
*Director of the United States Patent and Trademark Office*